(12) United States Patent
Zhang et al.

(10) Patent No.: US 11,099,323 B2
(45) Date of Patent: Aug. 24, 2021

(54) SURFACE PLASMON-OPTICAL-ELECTRICAL HYBRID CONDUCTION NANO HETEROSTRUCTURE AND PREPARATION METHOD THEREFOR

(71) Applicant: SOUTHEAST UNIVERSITY, Nanjing (CN)

(72) Inventors: Xiaoyang Zhang, Nanjing (CN); Tong Zhang, Nanjing (CN); Shanjiang Wang, Nanjing (CN); Xiaomei Xue, Nanjing (CN); Huanli Zhou, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/978,717

(22) PCT Filed: May 28, 2018

(86) PCT No.: PCT/CN2018/088737
§ 371 (c)(1),
(2) Date: Sep. 7, 2020

(87) PCT Pub. No.: WO2019/169747
PCT Pub. Date: Sep. 12, 2019

(65) Prior Publication Data
US 2020/0400887 A1  Dec. 24, 2020

(30) Foreign Application Priority Data
Mar. 7, 2018 (CN) .......................... 201810187105.0

(51) Int. Cl.
*G02B 6/122* (2006.01)
*G01Q 60/40* (2010.01)
*G02B 6/132* (2006.01)

(52) U.S. Cl.
CPC .......... *G02B 6/1226* (2013.01); *G01Q 60/40* (2013.01); *G02B 6/132* (2013.01)

(58) Field of Classification Search
CPC ..................................................... G02B 6/1226
See application file for complete search history.

(56) References Cited

U.S. PATENT DOCUMENTS

| 6,539,156 B1* | 3/2003 | Dickson ................ B82Y 20/00 385/129 |
| 2008/0083881 A1* | 4/2008 | Gorrell .................. B82Y 20/00 250/399 |

(Continued)

FOREIGN PATENT DOCUMENTS

| CN | 102176463 A | 9/2011 |
| CN | 102522470 A | 6/2012 |
| CN | 102810601 A | 12/2012 |

*Primary Examiner* — Chris H Chu
(74) *Attorney, Agent, or Firm* — Bayramoglu Law Offices LLC

(57) ABSTRACT

The present invention provides a surface plasmon-optical-electrical hybrid conduction nano heterostructure and a preparation method therefor. The structure includes an exciting light source, a semiconductor nano-structure array, a two-dimensional plasmonic micro-nano structure, a sub-wavelength plasmon polariton guided wave, an emergent optical wave, a one-dimensional plasmonic micro-nano structure, a wire, a metal electrode, a conductive substrate, a probe molecule, an atomic-force microscopic conductive probe and a voltage source. The method achieves a semiconductor seed crystal with controllable distribution and density by controlling free metal ions, air, water or oxygen on a metal substrate to achieve highly uniform control of the seed crystal, and then strictly controls a length-to-diameter ratio and distribution of a semiconductor structure by continuous growth. Therefore, a new nano optics platform is (Continued)

provided for studying various novel effects produced by interaction between light and substances.

10 Claims, 4 Drawing Sheets

(56) References Cited

U.S. PATENT DOCUMENTS

| | | | |
|---|---|---|---|
| 2009/0214159 A1* | 8/2009 | Hyun | B82Y 20/00 |
| | | | 385/14 |
| 2011/0220814 A1 | 9/2011 | Rudenja et al. | |
| 2014/0224989 A1* | 8/2014 | Long | G02F 1/0126 |
| | | | 250/338.4 |
| 2015/0126046 A1* | 5/2015 | Funk | H01J 37/32266 |
| | | | 438/798 |
| 2015/0338345 A1* | 11/2015 | Lakowicz | G02B 5/008 |
| | | | 435/5 |
| 2018/0321442 A1* | 11/2018 | Yang | G02B 6/29368 |

* cited by examiner

SURFACE PLASMON-OPTICAL-ELECTRICAL HYBRID CONDUCTION NANO HETEROSTRUCTURE AND PREPARATION METHOD THEREFOR

CROSS REFERENCE TO THE RELATED APPLICATIONS

This application is the national phase entry of International Application No. PCT/CN2018/088737, filed on May 28, 2018, which is based upon and claims priority to Chinese Patent Application No. 201810187105.0, filed on Mar. 7, 2018, the entire contents of which are incorporated herein by reference.

TECHNICAL FIELD

The present invention relates to the fields of nanophotonics, nanomaterials and integrated photo-electric devices, and in particular, to a surface plasmon-optical-electrical hybrid conduction nano heterostructure platform and a preparation method for the same.

BACKGROUND

In recent years, highly integrated electronic chip techniques promote rapid development of electronic industry technologies. People are full of expectations of integration of optical device technologies and hope to achieve compatibility between an optical device system and an electronic device system, construct an optical-electrical hybrid chip system with abundant functions, and promote another leapfrog development of the chip technologies. However, due to existence of an optical diffraction limit, an optical signal can be transmitted only in a micron scale range. Consequently, conventional integrated optical devices cannot be compared with highly integrated electronic devices in terms of a unit size and a system volume. With the rise of plasmonics research, a new opportunity is provided for development of optical device technology integration. Compared with a conventional optical waveguide, the waveguide based on the surface plasmon polaritons has a stronger light trapping capability and supports a mode with a smaller spot size, thereby greatly improving an integration level of the optical devices.

A surface plasmon polariton signal can be excited by the optical signal. However, how to effectively convert the optical signal into the surface plasmon polariton signal and further achieve efficient coupled transmission of the optical signal and the surface plasmon polariton signal is still a problem at present. Experimental research indicates that efficiency of focusing and exciting a metal surface plasmon polariton signal by only using a lens is less than 2%. Therefore, it is necessary to introduce some auxiliary means to increase a wave vector of incident light to further improve efficiency of converting an optical wave into surface plasmon polaritons. So far, the auxiliary means, that is, various means that can achieve the mutual coupled transmission of the optical signal and the surface plasmon polariton signal, are mainly manufacturing an optical waveguide device and a metal plasmonic waveguide device separately, and making the two devices close to each other or be welded together, to achieve interconnection and transmission of the optical signal and the surface plasmon polariton signal by using a near-field coupling effect; or manufacturing a heterostructure device composed of a medium and a metal structure by using a micro-nano processing technique in combination with a thin film deposition technique. However, when signals are coupled, a very large insertion loss is certainly introduced into the optical waveguide device and the plasmonic waveguide device made by the means. Reasons for generation of the loss include: roughness at a coupling interface between the optical medium and the metal structure causing a scattering loss, and material defects caused by various nano processing techniques such as coating, lithography and etching causing side-wall scattering and end-face scattering losses of the waveguide. Therefore, either the optical signal or the electrical signal cannot be effectively transmitted, which greatly reduces the optical transmission efficiency of the devices. Additionally, there still are bottleneck problems, such as complex processes, high cost, and inability of achieving mass production, in terms of process methods. Therefore, how to effectively achieve effective and low-loss coupling between optical-plasmon modes is a current key issue to be urgently explored and solved.

At present, there is no one directly combining a plasmonic metal micro-nano structure and a semiconductor optical-electrical hybrid device to achieve a plasmon-optical-electrical coupling mode. Therefore, this patent provides a surface plasmon-optical-electrical hybrid conduction nano heterostructure platform. A monocrystalline and atom-level plasmon and a semiconductor material are directly combined, and an effective lattice match between the materials is used, achieving true zero contact, greatly reducing the transmission loss at the coupling interface, and providing a new nano optics platform for studying various novel effects produced by interaction between light and substances.

SUMMARY

Technical Problem: An objective of the present invention is overcoming disadvantages of the prior art, and providing a surface plasmon-optical-electrical hybrid conduction nano heterostructure and a preparation method. In the method, a size and density of a seed crystal are controlled by the number of rounds of adding water, and highly uniform control of the seed crystal is achieved. A length-to-diameter ratio and distribution of a semiconductor structure are strictly controlled by continuous growth. The surface plasmon-optical-electrical hybrid conduction nano heterostructure platform with a semiconductor structure with controllable density and a controllable length-to-diameter ratio directly grown on a plasmonic metal micro-nano structure has an important application in the fields of nanomaterials and integrated photo-electric devices.

Technical solutions: A surface plasmon-optical-electrical hybrid conduction nano heterostructure, the structure comprising: an exciting light source, a semiconductor nanostructure array, a two-dimensional plasmonic micro-nanoplasmonic micro-nano structure, a sub-wavelength plasmon polariton guided wave, an emergent optical wave, a one-dimensional plasmonic micro-nanoplasmonic micro-nano structure, a wire, a metal electrode, a conductive substrate, a probe molecule, an atomic-force microscopic conductive probe and a voltage source, wherein the semiconductor nano-structure array is located on an upper surface of the two-dimensional plasmonic micro-nanoplasmonic micro-nano structure or an outer surface of the one-dimensional plasmonic micro-nanoplasmonic micro-nano structure and tight Schottky contact is formed; the exciting light source vertically irradiates the upper surface of the two-dimensional plasmonic micro-nanoplasmonic micro-nano structure or the outer surface of the one-dimensional plasmonic micro-nanoplasmonic micro-nano structure; the probe molecule is located on a surface of the semiconductor nano-structure array, the sub-wavelength plasmon polariton guided wave is diffused on a surface of the two-dimensional plasmonic micro-nanoplasmonic micro-nano structure or the one-dimensional plasmonic micro-nanoplasmonic micro-nano structure, and the emergent optical wave is located on a pointed end of the semiconductor nano-structure array; in the two-dimensional plasmonic micro-nanoplasmonic micro-nano structure, an input end of the voltage source is connected to the atomic-force microscopic conductive probe by the wire, and an output end of the voltage source is connected to the conductive substrate by the wire; and in the one-dimensional plasmonic micro-nanoplasmonic micro-nano structure, the input end of the voltage source is connected to the conductive substrate, and the output end of the voltage source is connected to the metal electrode.

Wherein:

The two-dimensional plasmonic micro-nanoplasmonic micro-nano structure and the one-dimensional plasmonic micro-nano structure are anisotropic structures with morphology of a triangular plate, a wire or a polyhedron, and a size of 1-1000 μm, and an optional material thereof is a one-dimensional or two-dimensional metal crystal material with a plasmonic effect such as gold, silver, copper, aluminum or platinum.

An optional material of the conductive substrate is a chemically active metal material likely to have an oxidation reaction with external water or oxygen, such as aluminum, tin, copper, iron, or zinc. Different metals react with water or oxygen chemically at different rates, and generated metal-oxide semiconductor seed crystals have different physical and chemical properties. Therefore, distribution density and morphology of the semiconductor seed crystals on the plasmonic micro-nano structure can be precisely controlled to further obtain the subsequently grown surface plasmon-optical-electrical hybrid conduction nano heterostructure platform with different morphology, structures and functions by optimized design of the semiconductor seed crystals.

A semiconductor nano structure of the semiconductor nano-structure array is a one-dimensional semiconductor nano structure with morphology of a nanorod, a nanocone or a nanotube, a length of 1-1000 μm, a diameter of 0.1-1000 μm, and a spacing of 1-10000 nm, or a zero-dimensional, two-dimensional or complex helical crystal structure; and an optional material thereof is zinc oxide, titanium dioxide or aluminum oxide.

An optional material of the metal electrode is gold, silver or platinum; and an optional material of the conductive substrate is a conductive carrier such as indium tin oxide (ITO), fluorine-doped tin oxide (FTO), or graphite, with a thickness of 100 nm to 10000 μm.

An optional material of the probe molecule is Rhodamine 6G, 4-aminothiophenol (4-ATP) or 4-mercaptopyridine (4-MPY).

The exciting light source is a single-wavelength light source or a broad spectrum light source with a wavelength range of 300-3000 nm covering an ultraviolet waveband to a mid-infrared waveband.

The preparation method for the surface plasmon-optical-electrical hybrid conduction nano heterostructure comprising the following steps:

step one: preparation of a monocrystalline and density-controllable semiconductor seed crystal evenly coating a clean metallic active substrate with a plasmonic micro-nano structure solution, to naturally dry in the air, and obtain an evenly distributed plasmonic micro-nano structure; evenly coating the metallic active substrate with deionized water, to naturally dry in the air, and obtain a semiconductor seed crystal structure evenly distributed on the plasmonic micro-nano structure; controlling distribution density and morphology of the semiconductor seed crystal on the plasmonic micro-nano structure by selecting metallic active substrates with different activities and an amount of the coating deionized water; and step two: growing semiconductor nanowires on the plasmonic micro-nano structure directionally growing, by using a vapor deposition method or a solution deposition method, the semiconductor nanowires with controllable density and an adjustable length-to-diameter ratio on a surface of the plasmonic micro-nano structure with the semiconductor seed crystal as a core, and obtaining a surface plasmon-optical-electrical hybrid conduction nano heterostructure platform formed by a metal and a semiconductor heterostructure;

in the vapor deposition method, weighing a metal salt and placing the metal salt into a porcelain boat, placing the metallic active substrate in the center of a tube furnace, injecting high-purity $N_2$, adjusting the temperature of a deposition chamber of the tube furnace to 100-700° C., reacting at a constant temperature for 0.5-10 h, and finally naturally cooling the temperature to the room temperature, to obtain a sample; and in the solution deposition method, separately weighing a weak reducing agent, a surface capping agent and a metal salt to prepare a corresponding continuous growth solution, stirring the solution at a low speed and heating the solution to 60-80° C. to fully dissolve the solution, stopping stirring the solution, placing the metallic active substrate in the continuous growth solution, and keeping the temperature unchanged for 2-180 h; and finally taking the metallic active substrate out, and thoroughly rinsing impurities on the surface of the metallic active substrate, to naturally dry in the air.

Operation methods for the surface plasmon-optical-electrical hybrid conduction nano heterostructure separately as two types of integrated photoelectric devices: The first type is a passive one-dimensional and two-dimensional surface plasmon integration nano transmission platform, which can form a sub-wavelength surface plasmon polariton signal transmission waveguide on surfaces of a one-dimensional plasmonic micro-nanoplasmonic micro-nano structure and a two-dimensional plasmonic micro-nanoplasmonic micro-nano structure and take a semiconductor nanowire as an optical waveguide for transmitting an optical wave, to interconnect a surface plasmon polariton signal and an optical signal. A grating structure formed by a semiconductor nanowire array 2 with controllable density is used to increase a wave vector of incident light and enhance coupling excitation and emission efficiency between the optical signal and the surface plasmon polariton signal; or further an introduced "hot spot" is modified by metal particles to form a zero-dimensional scattered point light source, and an optical signal and surface plasmon polariton signal device and system with certain functions is constructed on the surface plasmon-optical-electrical hybrid conduction nano heterostructure platform. The second type is an active heterogeneous integration device formed by a semiconductor nano crystal light source with an optical gain characteristic and a plasmonic waveguide, which can form a one-dimensional sub-wavelength scattered light source on edges of the one-dimensional plasmonic micro-nanoplasmonic micro-nano structure and the two-dimensional plasmonic micro-nanoplasmonic micro-nano structure to achieve effective the plasmon-optical-electrical coupling and energy conversion at a nanoscale; or a photoelectric conversion effect of the semiconductor nanowire is used to convert an optical signal incident on a surface of the semiconductor nanowire into an electrical signal, and the electrical signal is transmitted by the plasmonic micro-nanoplasmonic micro-nano structure with a conduction characteristic to interconnect and transmit surface plasmon-optical-electrical signals on a chip.

An optional material of the metal salt is aluminum chloride, tin tetrachloride, ferric nitrate or zinc acetate.

An optional material of the weak reducing agent solution is ascorbic acid (AA), an aqueous solution of hydrogen peroxide ($H_2O_2$) or hexamethylene tetramine (HTMA); and an optional material of the surface capping agent is polyethylenimine (PEI), triton X-100, or sodium bis(2-ethylhexyl) sulfosuccinate (AOT).

Advantageous Effect: Compared with the prior art, the present invention has the following advantages:

1. The present invention first provides a surface plasmon-optical-electrical hybrid conduction nano heterostructure platform and provides a new medium for achieving mixing, interconnection and low scattering loss conduction of surface plasmon, optical and electrical signals, which can be widely used to develop a high-density integrated photoelectric device and system in the future. Compared with defects, such as a high loss, a complex process, and difficulty in mass production, caused by the internationally reported integrated photoelectric device achieved in a manner such as near-field coupling or physical contact, the nano platform not only effectively avoids the above problems, but also has advantages such as simultaneous multi-wavelength and wide-spectrum excitation, low loss transmission, and extensibility of transmission directions to a plurality of dimensions. At the same time, an electronic chip technique of a CMOS process can be directly interconnected with the nano platform to achieve photoelectric multiplexing, which has a powerful information processing function.

2. A plasmon metal-semiconductor photoelectric device developed based on a conventional coating technique and a conventional micro-nano pattern processing technique has problems such as poor crystal quality and many interface defects, leading to its large optical loss. The present invention provides a surface plasmon-semiconductor heterojunction structure. An atom-level plasmonic micro-nanoplasmonic micro-nano structure is taken as a processing platform to grow a one-dimensional monocrystalline semiconductor nano structure with a controllable length-to-diameter ratio, which avoids problems such as impurity defects and rough surfaces, achieves a lattice match between the single crystal to the single crystal, greatly reduces surface and interface losses, and can achieve the effective coupling, transmission and resonance of the light at a nanosize.

3. The present invention provides a new preparation method for the semiconductor seed crystal with adjustable density and controllable distribution. Based on conventional methods for synthesizing a seed crystal such as evaporation, magnetron sputtering, and chemical reduction, a resulting problem is that none of a size, morphology and distribution of the semiconductor is controllable. The present invention can strictly control the semiconductor seed crystal density and distribution by adjusting water, oxygen, temperature and free metal ions provided by a metal substrate, which is a breakthrough in an existing process of controllably growing the semiconductor seed crystal on the plasmonic micro-nanoplasmonic micro-nano structure. The seed crystal construction method is generally applicable to continuous growth of the one-dimensional semiconductor nano structure by a subsequent chemical method, which greatly improves practicality.

4. Generally, a wave vector of a surface plasmon wave is larger than a wave vector of an optical wave, and therefore it is impossible to directly excite the surface plasmon wave by using the optical wave, that is, a wave vector matching condition is not met. Additional special structures need to be introduced into conventional manners of achieving the wave vector match, such as prism coupling, grating coupling and near-field coupling, which increases a volume of the device. Moreover, due to a scattering loss caused by roughness at a coupling interface, and side-wall scattering and end-face scattering losses of the waveguide caused by material defects caused by nano processing techniques, either the optical signal or the electrical signal cannot be effectively transmitted. The present invention uses a grating structure formed by a semiconductor nanowire array with controllable density as a scattering center, which can greatly increase the wave vector of the incident light to enhance coupling excitation and emission efficiency between the optical signal and the surface plasmon polariton signal. A monocrystalline and atom-level plasmon and a semiconductor material are directly combined, and an effective lattice match between the materials is used, greatly reducing the transmission loss at the coupling interface, greatly improving internal quantum efficiency of the device, and therefore surface plasmon-optical-electrical signals can be efficiently interconnected and transmitted on a chip.

Figure 1:
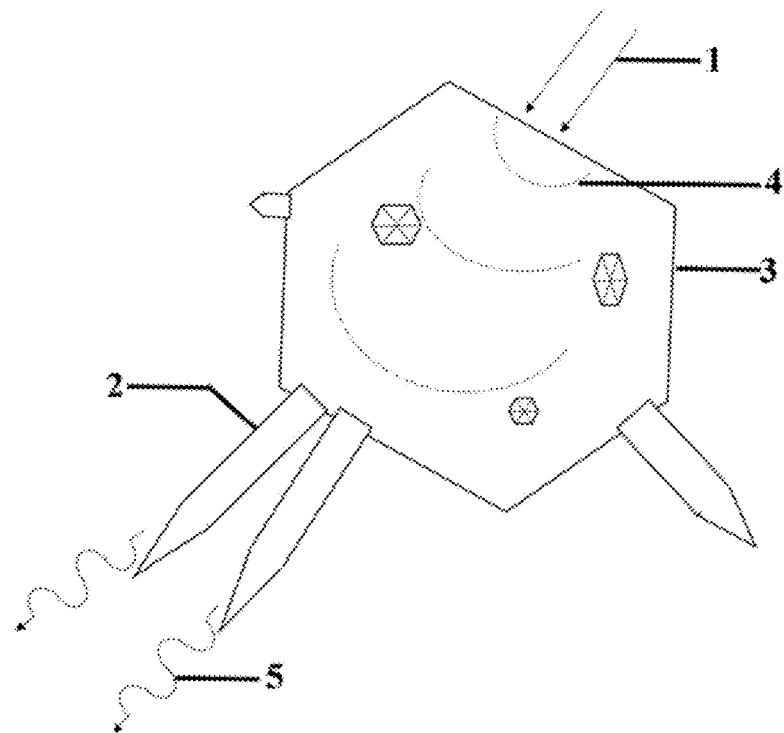
FIG. 1 is a transmission diagram of plasmon-optical signals of a two-dimensional plasmonic micro-nanoplasmonic micro-nano structure-sparse semiconductor hybrid integrated nano platform structure.

In the figures, there are an exciting light source 1, a semiconductor nano-structure array 2, a two-dimensional plasmonic micro-nanoplasmonic micro-nano structure 3, a sub-wavelength plasmon polariton guided wave 4, an emergent optical wave 5, a one-dimensional plasmonic micro-nanoplasmonic micro-nano structure 6, a wire 7, a metal electrode 8, a conductive substrate 9, a probe molecule 10, an atomic-force microscopic (AFM) conductive probe 11 and a voltage source 12.

DETAILED DESCRIPTION OF THE EMBODIMENTS

A surface plasmon-optical-electrical hybrid conduction nano heterostructure, the structure comprising: an exciting light source, a semiconductor nano-structure array, a two-dimensional plasmonic micro-nanoplasmonic micro-nano structure, a sub-wavelength plasmon polariton guided wave, an emergent optical wave, a one-dimensional plasmonic micro-nanoplasmonic micro-nano structure, a wire, a metal electrode, a conductive substrate, a probe molecule, an atomic-force microscopic conductive probe and a voltage source, wherein the semiconductor nano-structure array is located on an upper surface of the two-dimensional plasmonic micro-nanoplasmonic micro-nano structure or an outer surface of the one-dimensional plasmonic micro-nanoplasmonic micro-nano structure and tight Schottky contact is formed; the exciting light source vertically irradiates the upper surface of the two-dimensional plasmonic micro-nanoplasmonic micro-nano structure or the outer surface of the one-dimensional plasmonic micro-nanoplasmonic micro-nano structure; the probe molecule is located on a surface of the semiconductor nano-structure array, the sub-wavelength plasmon polariton guided wave is diffused on a surface of the two-dimensional plasmonic micro-nanoplasmonic micro-nano structure or the one-dimensional plasmonic micro-nanoplasmonic micro-nano structure, and the emergent optical wave is located on a pointed end of the semiconductor nano-structure array; in the two-dimensional plasmonic micro-nanoplasmonic micro-nano structure, an input end of the voltage source is connected to the atomic-force microscopic conductive probe by the wire, and an output end of the voltage source is connected to the conductive substrate by the wire; and in the one-dimensional plasmonic micro-nanoplasmonic micro-nano structure, the input end of the voltage source is connected to the conductive substrate, and the output end of the voltage source is connected to the metal electrode.

The preparation method for the surface plasmon-optical-electrical hybrid conduction nano heterostructure comprising the following steps:

step one: preparation of a monocrystalline and density-controllable semiconductor seed crystal evenly coating a clean metallic active substrate with a plasmonic micro-nano structure solution, to naturally dry in the air, and obtain an evenly distributed plasmonic micro-nano structure; evenly coating the metallic active substrate with deionized water, to naturally dry in the air, and obtain a semiconductor seed crystal structure evenly distributed on the plasmonic micro-nano structure; controlling distribution density and morphology of the semiconductor seed crystal on the plasmonic micro-nano structure by selecting metallic active substrates with different activities and an amount of the coating deionized water; and step two: growing semiconductor nanowires on the plasmonic micro-nano structure directionally growing, by using a vapor deposition method or a solution deposition method, the semiconductor nanowires with controllable density and an adjustable length-to-diameter ratio on a surface of the plasmonic micro-nano structure with the semiconductor seed crystal as a core, and obtaining a surface plasmon-optical-electrical hybrid conduction nano heterostructure platform formed by a metal and a semiconductor heterostructure;

in the vapor deposition method, weighing a metal salt and placing the metal salt into a porcelain boat, placing the metallic active substrate in the center of a tube furnace, injecting high-purity $N_2$, adjusting the temperature of a deposition chamber of the tube furnace to 100-700° C., reacting at a constant temperature for 0.5-10 h, and finally naturally cooling the temperature to the room temperature, to obtain a sample; and in the solution deposition method, separately weighing a weak reducing agent, a surface capping agent and a metal salt to prepare a corresponding continuous growth solution, stirring the solution at a low speed and heating the solution to 60-80° C. to fully dissolve the solution, stopping stirring the solution, placing the metallic active substrate in the continuous growth solution, and keeping the temperature unchanged for 2-180 h; and finally taking the metallic active substrate out, and thoroughly rinsing impurities on the surface of the metallic active substrate, to naturally dry in the air.

Operation methods for the surface plasmon-optical-electrical hybrid conduction nano heterostructure separately as two types of integrated photoelectric devices: The first type is a passive one-dimensional and two-dimensional surface plasmon integration nano transmission platform, which can form a sub-wavelength surface plasmon polariton signal transmission waveguide on surfaces of a one-dimensional plasmonic micro-nanoplasmonic micro-nano structure and a two-dimensional plasmonic micro-nanoplasmonic micro-nano structure and take a semiconductor nanowire as an optical waveguide for transmitting an optical wave, to interconnect a surface plasmon polariton signal and an optical signal. A grating structure formed by a semiconductor nanowire array 2 with controllable density is used to increase a wave vector of incident light and enhance coupling excitation and emission efficiency between the optical signal and the surface plasmon polariton signal; or further an introduced "hot spot" is modified by metal particles to form a zero-dimensional scattered point light source, and an optical signal and surface plasmon polariton signal device and system with certain functions is constructed on the surface plasmon-optical-electrical hybrid conduction nano heterostructure platform. The second type is an active heterogeneous integration device formed by a semiconductor nano crystal light source with an optical gain characteristic and a plasmonic waveguide, which can form a one-dimensional sub-wavelength scattered light source on edges of the one-dimensional plasmonic micro-nanoplasmonic micro-nano structure and the two-dimensional plasmonic micro-nanoplasmonic micro-nano structure to achieve effective the plasmon-optical-electrical coupling and energy conversion at a nanoscale; or a photoelectric conversion effect of the semiconductor nanowire is used to convert an optical signal incident on a surface of the semiconductor nanowire into an electrical signal, and the electrical signal is transmitted by the plasmonic micro-nanoplasmonic micro-nano structure with a conduction characteristic to interconnect and transmit surface plasmon-optical-electrical signals on a chip.

The two-dimensional plasmonic micro-nanoplasmonic micro-nano structure and the one-dimensional plasmonic micro-nano structure are anisotropic structures with morphology of a triangular plate, a wire or a polyhedron, and a size of 1-1000 µm, and an optional material thereof is a one-dimensional or two-dimensional metal crystal material with a plasmonic effect such as gold, silver, copper, aluminum or platinum An optional material of the conductive substrate is a chemically active metal material likely to have an oxidation reaction with external water or oxygen, such as aluminum, tin, copper, iron, or zinc. Different metals react with water or oxygen chemically at different rates, and generated metal-oxide semiconductor seed crystals have different physical and chemical properties. Therefore, distribution density and morphology of the semiconductor seed crystals on the plasmonic micro-nano structure can be precisely controlled to further obtain the subsequently grown surface plasmon-optical-electrical hybrid conduction nano heterostructure platform with different morphology, structures and functions by optimized design of the semiconductor seed crystals.

A semiconductor nano structure of the semiconductor nano-structure array is a one-dimensional semiconductor nano structure with morphology of a nanorod, a nanocone or a nanotube, a length of 1-1000 µm, a diameter of 0.1-1000 µm, and a spacing of 1-10000 nm, or a zero-dimensional, two-dimensional or complex helical crystal structure; and an optional material thereof is zinc oxide, titanium dioxide or aluminum oxide.

The deionized water is 0-1000 µl, the number of adding water is 0-15.

An optional material of the metal salt is aluminum chloride, tin tetrachloride, ferric nitrate or zinc acetate, an optional material of the weak reducing agent solution is ascorbic acid (AA), an aqueous solution of hydrogen peroxide ($H_2O_2$) or hexamethylene tetramine (HTMA); and an optional material of the surface capping agent is polyethylenimine (PEI), triton X-100, or sodium bis(2-ethylhexyl) sulfosuccinate (AOT).

An optional material of the metal electrode is gold, silver or platinum; and an optional material of the conductive substrate is a conductive carrier such as indium tin oxide (ITO), fluorine-doped tin oxide (FTO), or graphite, with a thickness of 100 nm to 10000 µm.

An optional material of the probe molecule is Rhodamine 6G, 4-aminothiophenol (4-ATP) or 4-mercaptopyridine (4-MPY).

The exciting light source is a single-wavelength light source or a broad spectrum light source with a wavelength range of 300-3000 nm covering an ultraviolet waveband to a mid-infrared waveband.

Figure 2:
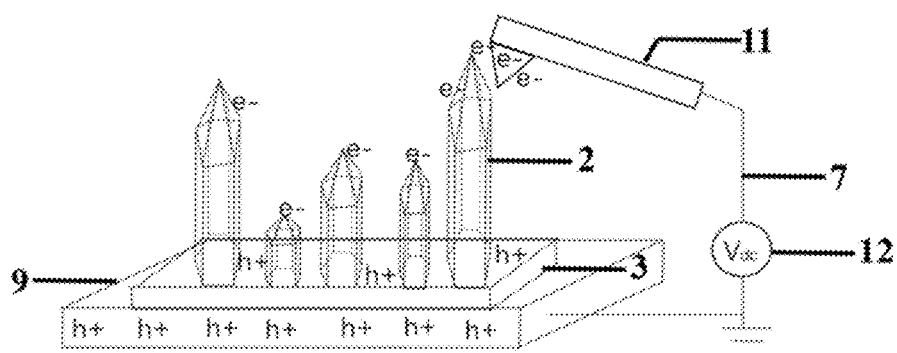
FIG. 2 is a transmission and collecting diagram of plasmon-electrical signals of a two-dimensional plasmonic micro-nanoplasmonic micro-nano structure-sparse semiconductor hybrid integrated nano platform structure.
Figure 3:
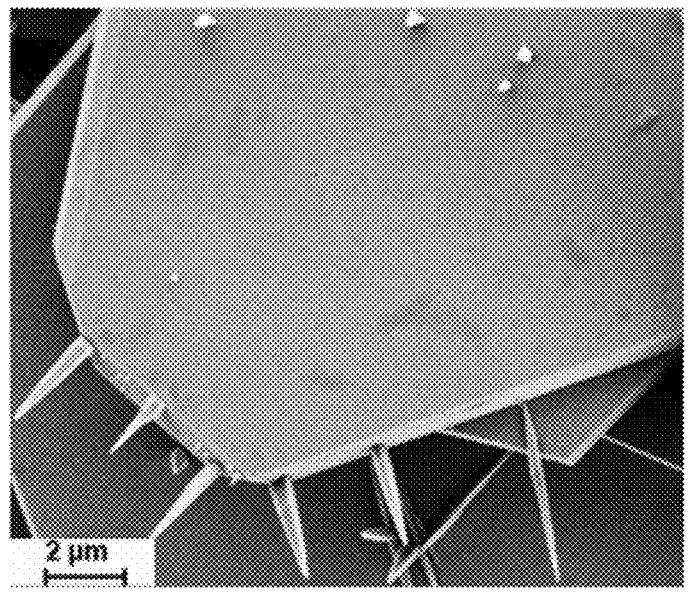
FIG. 3 is a scanning electron microscope (SEM) diagram of a two-dimensional plasmonic micro-nanoplasmonic micro-nano structure-sparse semiconductor hybrid integrated nano platform structure.

The present invention is further described below with reference to specific examples and comparative examples:

Example 1: As shown in FIG. 1 to FIG. 3, the two-dimensional plasmonic micro-nanoplasmonic micro-nano structure-sparse semiconductor hybrid integrated nano platform includes an exciting light source being a single-wavelength light source with a wavelength of 532 nm, a semiconductor nano-structure array being a zinc oxide nanocone array with a length of 10 µm, a diameter of 1 µm and a spacing of 1000 nm, and a two-dimensional plasmonic micro-nanoplasmonic micro-nano structure being a silver triangular plate with a size of 30 µm. The position relationships thereof are as follows: The zinc oxide nanocone array is located on a side surface of the silver triangular plate, and tight Schottky contact is formed. When the exciting light source vertically irradiates the side surface of the silver triangular plate, a sub-wavelength plasmon polariton guided wave diffused along a surface of the silver triangular plate is excited. The guided wave is converted into an emergent optical wave again on a pointed end of the zinc oxide nanocone array to achieve conversion of an optical-plasmon-optical mode. Due to reversibility of a light path, the process can be reversed. At the same time, a Schottky barrier exists at an interface between the silver triangular plate and the zinc oxide nanocone array. High-energy photo-generated electrons (namely, "hot electrons") excited by metal plasmons cross the barrier to effectively achieve separation of electron hole pairs. Under the action of an external energized circuit, directional transmission and collection of electrons and conversion of an optical-plasmon-electrical mode are achieved. Therefore, the platform can be used as an optical-plasmon-electrical hybrid integrated nano platform.

To obtain structures shown in FIG. 1 to FIG. 3, preparation includes the following steps:

Step One: Preparation of a Monocrystalline and Density-Controllable Semiconductor Seed Crystal A clean active metal substrate was evenly coated with a certain amount of a silver triangular plate solution, to naturally dry in the air, and obtain an evenly distributed silver triangular plate nano structure. The active metal substrate was evenly coated with 100 µl of deionized water, to naturally dry in the air, and obtain a semiconductor seed crystal structure evenly distributed on the silver triangular plate.

Step Two: Continuous Growth of the Semiconductor Seed Crystal

A vapor deposition method was used to achieve the continuous growth for growing zinc oxide nanowires with controllable density and an adjustable length-to-diameter ratio; and in the vapor deposition method, a certain amount of zinc nitrate was weighed and placed into a porcelain boat, a metal zinc substrate was placed in the center of a tube furnace, and high-purity $N_2$ was injected. The temperature of a deposition chamber of the tube furnace was adjusted to 300° C., and reaction was performed at a constant temperature for 2 h. Finally the temperature was naturally cooled to the room temperature, and a sample was taken out.

Figure 4:
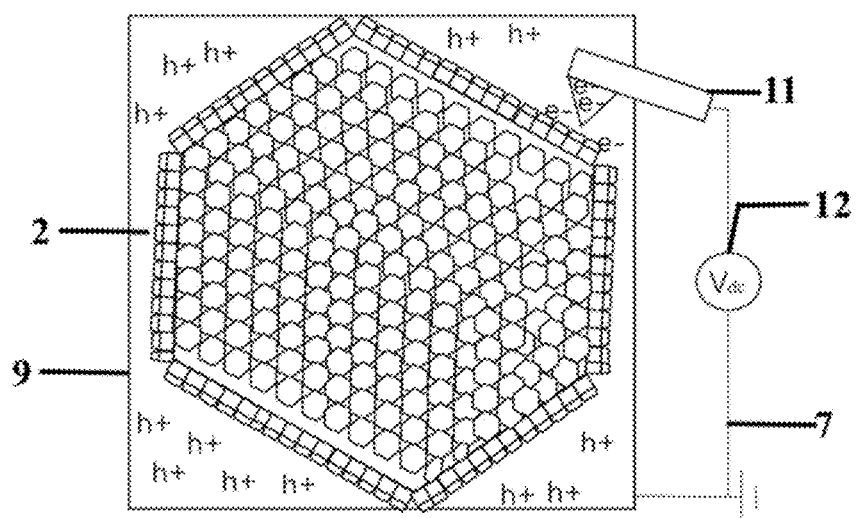
FIG. 4 is a transmission and collecting diagram of plasmon-electrical signals of a two-dimensional plasmonic micro-nanoplasmonic micro-nano structure-dense semiconductor hybrid integrated nano platform structure.
Figure 5:
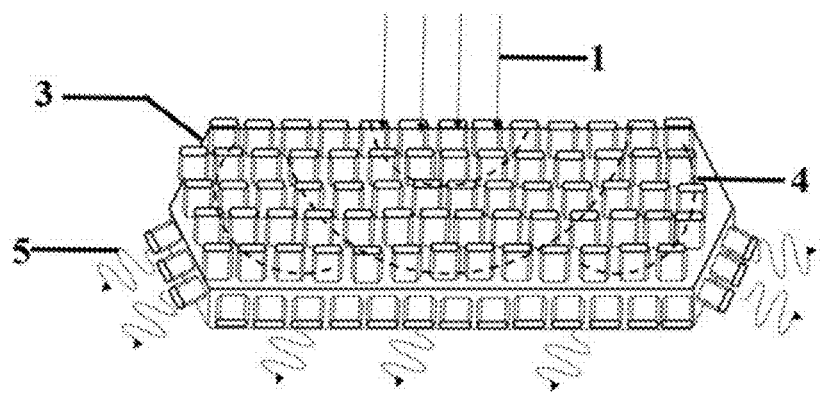
FIG. 5 is a transmission and collecting diagram of plasmon-optical signals of a two-dimensional plasmonic micro-nanoplasmonic micro-nano structure-dense semiconductor hybrid integrated nano platform structure.
Figure 6:
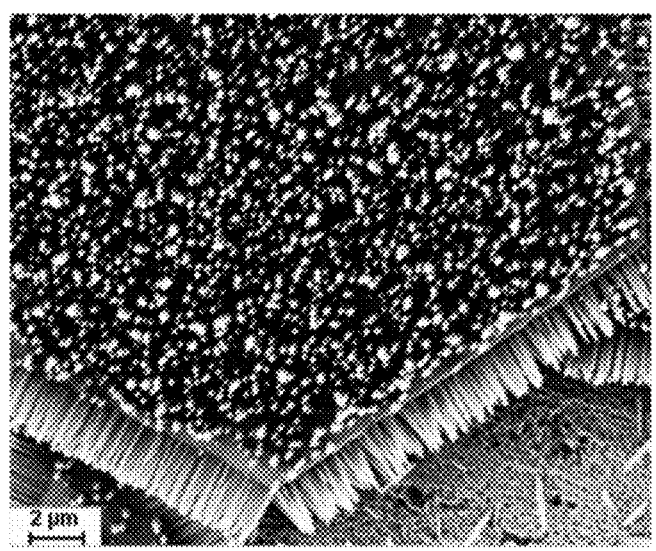
FIG. 6 is a scanning electron microscope (SEM) diagram of a two-dimensional plasmonic micro-nanoplasmonic micro-nano structure-dense semiconductor hybrid integrated nano platform structure.

Example 2: As shown in FIG. 4 to FIG. 6, the two-dimensional plasmonic micro-nanoplasmonic micro-nano structure-dense semiconductor hybrid integrated nano platform structure includes an exciting light source being a single-wavelength light source with a wavelength of 785 nm, a semiconductor nano-structure array being a zinc oxide nanorod array with a length of 1 µm, a diameter of 0.5 µm and a spacing of 1 nm, and a two-dimensional plasmonic micro-nanoplasmonic micro-nano structure being a silver triangular plate with a size of 10 µm. The position relationships thereof are as follows: The zinc oxide nanorod array is located on a surface and a side surface of the silver triangular plate, and tight Schottky contact is formed. When the exciting light source vertically irradiates the side surface of the silver triangular plate, due to a wave vector match, a sub-wavelength plasmon polariton guided wave diffused along a surface of the silver triangular plate is excited. The guided wave is converted into an emergent optical wave again on a pointed end of the zinc oxide nanorod array on the surface of the silver triangular plate to achieve conversion of an optical-plasmon-optical mode. Due to reversibility of a light path, the process can be reversed. At the same time, a Schottky barrier exists at an interface between the silver triangular plate and the zinc oxide nanorod array. High-energy photo-generated electrons (namely, "hot electrons") excited by metal plasmons cross the barrier to effectively achieve separation of electron hole pairs. Under the action of an external energized circuit, directional transmission and collection of electrons and conversion of an optical-plasmon-electrical mode are achieved. Therefore, the platform can be used as an optical-plasmon-electrical hybrid integrated nano platform.

To obtain structures shown in FIG. 4 to FIG. 6, preparation includes the following steps:

Step One: Preparation of a Monocrystalline and Density-Controllable Semiconductor Seed Crystal A clean active metal substrate was evenly coated with a certain amount of a silver triangular plate solution, to naturally dry in the air, and obtain an evenly distributed silver triangular plate nano structure. The active metal substrate was evenly coated with 200 μl of deionized water, to naturally dry in the air, and obtain a zinc oxide seed crystal structure evenly distributed on the silver triangular plate.

Step Two: Continuous Growth of the Semiconductor Seed Crystal

A solution deposition method was used to achieve the continuous growth for growing semiconductor nanowires with controllable density and an adjustable length-to-diameter ratio; and in the solution deposition method, a certain amount of ascorbic acid (AA), a certain amount of polyethylenimine (PEI) and a certain amount of zinc oxide were separately weighed to prepare a corresponding continuous growth solution. The solution was stirred at a low speed and heated to 80° C. to fully dissolve the solution. The solution was stopped from being stirred, and the active metal substrate was placed in the continuous growth solution. The temperature was kept unchanged for 8 h. Finally the substrate was taken out, and impurities on the surface were thoroughly rinsed, to naturally dry in the air.

Figure 7:
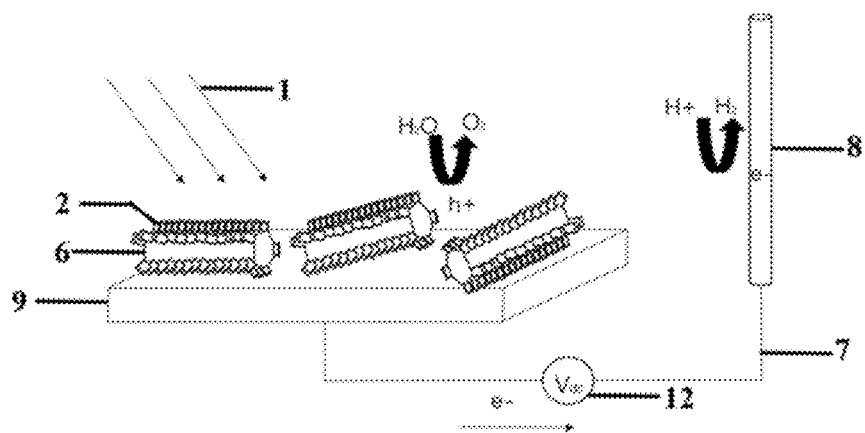
FIG. 7 is a plasmon-optical-electrical heterogeneous integrated photocatalytic reaction apparatus formed by a one-dimensional plasmonic micro-nanoplasmonic micro-nano structure-dense semiconductor heterojunction and a metal electrode.

Example 3: As shown in FIG. 7, a plasmon-optical-electrical heterogeneous integrated photocatalytic reaction apparatus structure formed by a one-dimensional plasmonic micro-nanoplasmonic micro-nano structure-dense semiconductor heterojunction and a metal electrode includes an exciting light source being a broad spectrum light source of 400-2000 nm, a semiconductor nano-structure array being a zinc oxide nanorod array with a length of 2 μm, a diameter of 1 μm and a spacing of 100 nm, and a one-dimensional plasmonic micro-nanoplasmonic micro-nano structure being a silver nanorod with a size of 80 μm. The position relationships thereof are as follows: The zinc oxide nanorod array is located on a side surface of the silver nanorod, and tight Schottky contact is formed. The heterojunction is deposited on a thin film of indium tin oxide with a thickness of 500 nm, and the thin film of indium tin oxide is connected to a platinum electrode by a wire to form a photoanode and a photocathode respectively. When the exciting light source vertically irradiates a surface of the thin film of indium tin oxide loaded with the heterojunction, a surface plasmon effect of the silver nanorod is excited, generated "hot electrons" cross a Schottky barrier between the silver nanorod and an aluminum oxide nanorod and are injected into the aluminum oxide nanorod, achieving effective separation of photo-generated electron hole pairs. The generated electrons are transmitted to the platinum electrode along the wire, achieving a reduction reaction to produce hydrogen. The remaining holes undergo an oxidation reaction to decompose water to produce oxygen, achieving photocatalysis to decompose water to produce hydrogen.

To obtain a structure shown in FIG. 7, preparation includes the following steps:

Step One: Preparation of a Monocrystalline and Density-Controllable Semiconductor Seed Crystal A clean metal zinc substrate was evenly coated with a certain amount of a silver nanorod solution, to naturally dry in the air, and obtain an evenly distributed silver nanorod structure. The metal zinc substrate was evenly coated with 50 μl of deionized water, to naturally dry in the air, and obtain a zinc oxide seed crystal structure evenly distributed on the silver nanorod.

Step Two: Continuous Growth of the Semiconductor Seed Crystal

A solution deposition method was used to achieve the continuous growth for growing zinc oxide nanowires with controllable density and an adjustable length-to-diameter ratio; and in the solution deposition method, a certain amount of hexamethylene tetramine (HMTA), a certain amount of triton X-100 and a certain amount of zinc acetate were separately weighed to prepare a corresponding continuous growth solution. The solution was stirred at a low speed and heated to 60° C. to fully dissolve the solution. The solution was stopped from being stirred, and the metal zinc substrate was placed in the continuous growth solution. The temperature was kept unchanged for 4 h. Finally the substrate was taken out, and impurities on the surface were thoroughly rinsed, to naturally dry in the air.

Figure 8:
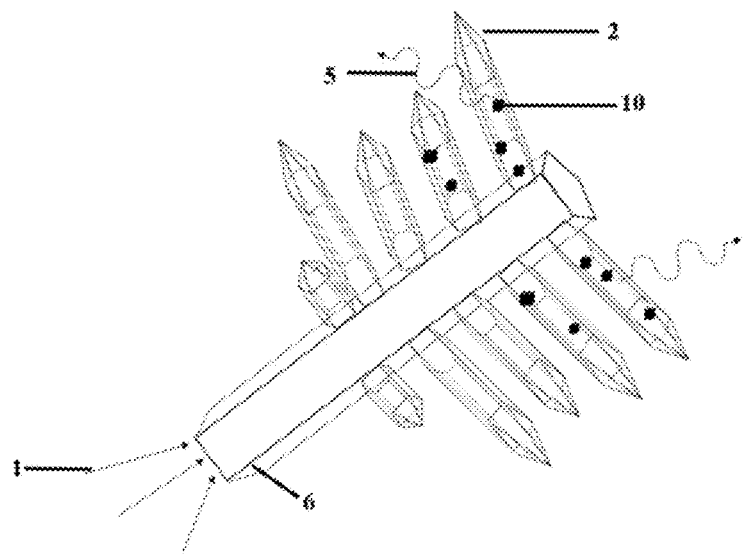
FIG. 8 is an in-situ remote sensing Raman photoelectric integrated device formed by a one-dimensional plasmonic micro-nanoplasmonic micro-nano structure-sparse semiconductor heterojunction and probe molecules.

Example 4: As shown in FIG. 8, an in-situ remote sensing Raman photoelectric integrated device structure formed by a one-dimensional plasmonic micro-nanoplasmonic micro-nano structure-sparse semiconductor heterojunction and probe molecules includes an exciting light source being a single-wavelength light source of 633 nm, a semiconductor nano-structure array being a tin oxide nanocone array with a length of 20 μm, a diameter of 5 μm and a spacing of 3000 nm, and a one-dimensional plasmonic micro-nanoplasmonic micro-nano structure being a platinum nanorod with a size of 100 μm. The position relationships thereof are as follows: The tin oxide nanocone array is located on a side surface of the platinum nanorod, tight Schottky contact is formed, and Rhodamine 6G is on a surface of the tin oxide nanocone array. When the exciting light source vertically irradiates an end of the platinum nanorod, a sub-wavelength plasmon polariton guided wave diffused along a radial direction of the platinum nanorod is excited. The sub-wavelength conduction wave reacts with Rhodamine 6G on the surface of the tin oxide nanocone array and is converted into an emergent optical wave signal, which is received by a detector, achieving in-situ remote sensing Raman signal detection.

To obtain a structure shown in FIG. 8, preparation includes the following steps:

Step One: Preparation of a Monocrystalline and Density-Controllable Semiconductor Seed Crystal A clean metal tin substrate was evenly coated with a certain amount of a platinum nanorod solution, to naturally dry in the air, and obtain an evenly distributed platinum nanorod structure. The metal tin substrate was evenly coated with 30 μl of deionized water, to naturally dry in the air, and obtain a tin oxide seed crystal structure evenly distributed on the platinum nanorod.

Step Two: Continuous Growth of the Semiconductor Seed Crystal

A vapor deposition method was used to achieve the continuous growth for growing semiconductor nanowires with controllable density and an adjustable length-to-diameter ratio; and in the vapor deposition method, a certain amount of tin tetrachloride was weighed and placed into a porcelain boat, a metal tin substrate was placed in the center of a tube furnace, and high-purity $N_2$ was injected. The temperature of a deposition chamber of the tube furnace was adjusted to 500° C., and reaction was performed at a constant temperature for 4 h. Finally the temperature was naturally cooled to the room temperature, and a sample was taken out.

Additionally, a person skilled in the art may further make other changes within the spirit of the present invention. Certainly, the changes made according to the spirit of the present invention should fall within the protection scope claimed by the present invention.

What is claimed is:

1. A surface plasmon-optical-electrical hybrid conduction nano heterostructure, the structure comprising: an exciting light source, a semiconductor nano-structure array, a two-dimensional plasmonic micro-nanoplasmonic micro-nano structure, a sub-wavelength plasmon polariton guided wave, an emergent optical wave, a one-dimensional plasmonic micro-nanoplasmonic micro-nano structure, a wire, a metal electrode, a conductive substrate, a probe molecule, an atomic-force microscopic conductive probe and a voltage source, wherein the semiconductor nano-structure array is located on an upper surface of the two-dimensional plasmonic micro-nanoplasmonic micro-nano structure or an outer surface of the one-dimensional plasmonic micro-nanoplasmonic micro-nano structure and a tight Schottky contact is formed; the exciting light source vertically irradiates the upper surface of the two-dimensional plasmonic micro-nanoplasmonic micro-nano structure or the outer surface of the one-dimensional plasmonic micro-nanoplasmonic micro-nano structure; the probe molecule is located on a surface of the semiconductor nano-structure array, the sub-wavelength plasmon polariton guided wave is diffused on a surface of the two-dimensional plasmonic micro-nanoplasmonic micro-nano structure or the one-dimensional plasmonic micro-nanoplasmonic micro-nano structure, and the emergent optical wave is located on a pointed end of the semiconductor nano-structure array; in the two-dimensional plasmonic micro-nanoplasmonic micro-nano structure, an input end of the voltage source is connected to the atomic-force microscopic conductive probe by the wire, and an output end of the voltage source is connected to the conductive substrate by the wire; and in the one-dimensional plasmonic micro-nanoplasmonic micro-nano structure, the input end of the voltage source is connected to the conductive substrate, and the output end of the voltage source is connected to the metal electrode.

2. The surface plasmon-optical-electrical hybrid conduction nano heterostructure according to claim 1, wherein the two-dimensional plasmonic micro-nanoplasmonic micro-nano structure and the one-dimensional plasmonic micro-nanoplasmonic micro-nano structure are anisotropic structures, wherein the anisotropic structures have a morphology of a triangular plate, a wire or a polyhedron, a size of 1-1000 μm, and a material of a one-dimensional or two-dimensional metal crystal material with a plasmonic effect, wherein the one-dimensional or two-dimensional metal crystal material with the plasmonic effect is gold, silver, copper, aluminum or platinum.

3. The surface plasmon-optical-electrical hybrid conduction nano heterostructure according to claim 1, wherein a material of the conductive substrate is aluminum, tin, copper, iron or zinc.

4. The surface plasmon-optical-electrical hybrid conduction nano heterostructure according to claim 1, wherein a semiconductor nano structure of the semiconductor nano-structure array is a one-dimensional semiconductor nano structure with a morphology of a nanorod, a nanocone or a nanotube, or a zero-dimensional, two-dimensional or complex helical crystal structure;

wherein the nanorod, the nanocone or the nanotube has a length of 1-1000 μm, a diameter of 0.1-1000 μm, and a spacing of 1-10000 nm; and a material of the semiconductor nano structure is zinc oxide, titanium dioxide or aluminum oxide.

5. The surface plasmon-optical-electrical hybrid conduction nano heterostructure according to claim 1, wherein a material of the metal electrode is gold, silver or platinum; and a material of the conductive substrate is a conductive carrier, wherein the conductive carrier is indium tin oxide (ITO), fluorine-doped tin oxide (FTO), or graphite, and has a thickness of 100 nm to 10000 μm.

6. The surface plasmon-optical-electrical hybrid conduction nano heterostructure according to claim 1, wherein a material of the probe molecule is Rhodamine 6G, 4-aminothiophenol (4-ATP) or 4-mercaptopyridine (4-MPY).

7. The surface plasmon-optical-electrical hybrid conduction nano heterostructure according to claim 1, wherein the exciting light source is a single-wavelength light source or a broad spectrum light source with a wavelength range of 300-3000 nm covering an ultraviolet waveband to a mid-infrared waveband.

8. A preparation method for the surface plasmon-optical-electrical hybrid conduction nano heterostructure according to claim 1, comprising the following steps:

step one: preparing a monocrystalline and density-controllable semiconductor seed crystal, comprising:

evenly coating a metallic active substrate with a layer of a plasmonic micro-nano structure solution, wherein the metallic active substrate is clean, air-drying the layer of the plasmonic micro-nano structure solution to obtain a plasmonic micro-nano structure evenly distributed on the metallic active substrate; evenly coating the metallic active substrate having the plasmonic micro-nano structure with a layer of deionized water, air-drying the layer of the deionized water to obtain a semiconductor seed crystal structure evenly distributed on the plasmonic micro-nano structure; controlling a distribution density and a morphology of the semiconductor seed crystal structure on the plasmonic micro-nano structure by selecting the metallic active substrate from metallic active substrates with different activities and an amount of the deionized water for coating; and step two: growing semiconductor nanowires on the plasmonic micro-nano structure directionally growing, by using a vapor deposition method or a solution deposition method, the semiconductor nanowires with a controllable density and an adjustable length-to-diameter ratio on a surface of the plasmonic micro-nano structure with the semiconductor seed crystal structure as a core, and obtaining a surface plasmon-optical-electrical hybrid conduction nano heterostructure platform formed by a metal and a semiconductor heterostructure; wherein in the vapor deposition method, weighing a metal salt and placing the metal salt into a porcelain boat, placing the metallic active substrate in a center of a tube furnace, injecting high-purity $N_2$, adjusting a temperature of a deposition chamber of the tube furnace to 100-700° C., reacting at a constant temperature for 0.5-10 h, and finally naturally cooling the temperature of the deposition chamber to a room temperature, to obtain a sample; and in the solution deposition method, separately weighing a weak reducing agent, a surface capping agent and a metal salt to prepare a continuous growth solution, stirring the continuous growth solution at a low speed and heating the continuous growth solution to 60-80° C. to fully dissolve the continuous growth solution, stopping stirring the continuous growth solution, placing the metallic active substrate in the continuous growth solution, and keeping the temperature unchanged for 2-180 h; and finally taking the metallic active substrate out, and thoroughly rinsing impurities on a surface of the metallic active substrate, and air-drying the surface of the metallic active substrate.

9. The preparation method according to claim 8, wherein a material of the metal salt is aluminum chloride, tin tetrachloride, ferric nitrate or zinc acetate.

10. The preparation method according to claim 8, wherein a material of the weak reducing agent is ascorbic acid (AA), hydrogen peroxide ($H_2O_2$) or hexamethylene tetramine (HTMA); and a material of the surface capping agent is polyethylenimine (PEI), triton X-100, or sodium bis(2-ethylhexyl) sulfosuccinate (AOT).

* * * * *